United States Patent [19]

Fukahori et al.

[11] Patent Number: 4,780,738
[45] Date of Patent: Oct. 25, 1988

[54] LENS DRIVE DEVICE FOR CAMERA

[75] Inventors: Hidehiko Fukahori; Shosuke Haraguchi, both of Kanagawa, Japan

[73] Assignee: Canon Kabushiki Kaisha, Japan

[21] Appl. No.: 887,375

[22] Filed: Jul. 17, 1986

[30] Foreign Application Priority Data

Jul. 19, 1985 [JP] Japan ................... 60-159641
Jul. 25, 1985 [JP] Japan ................... 60-165247

[51] Int. Cl.⁴ ............................................. G03B 3/10
[52] U.S. Cl. .................... 354/400; 354/195.1
[58] Field of Search ........... 354/400, 402, 409, 195.1, 354/195.12; 352/140; 358/227

[56] References Cited

U.S. PATENT DOCUMENTS 4,568,165 2/1986 Ishibashi ................... 354/195.1
4,572,643 2/1986 Akashi .......................... 354/409

FOREIGN PATENT DOCUMENTS 115523 7/1982 Japan ................... 354/400
200205 11/1984 Japan ................... 354/195.1

Primary Examiner—W. B. Perkey
Attorney, Agent, or Firm—Toren, McGeady & Associates

[57] ABSTRACT

A lens drive device for a camera having the auto-focus function and the manual focus function, wherein the automatic and manual focusings are functionally coordinated in such a manner that the manual focus function is rendered operative only after the in-focus condition is automatically established, or when the in-focus condition is impossible to detect, depending on the states of the output of a focus detecting circuit.

12 Claims, 2 Drawing Sheets

LENS DRIVE DEVICE FOR CAMERA

BACKGROUND OF THE INVENTION

1. Field of the Invention:

This invention relates to a lens drive device for auto-focusing, manual power focusing, or power zooming of a camera.

2. Description of the Related Art:

It has already been known to provide a lens drive device having the auto-focus and manual focus made selectively operable. In this conventional device, the auto-focus mode and the manual focus mode, being modes utterly independent of each other, could be selectively set by the photographer. With the device previously set in the manual focus mode, therefore, when the photographer was to perform focusing automatically, he had to manipulate a mode selector so that the device was switched from the manual to the automatic focusing mode. After shootings had been made with manual focusing, if the switching back to the auto-focus mode was forgot to do, the photographer, when in the next shot under the mistaken presumption that the auto-focus mode was operating, would fail, despite actuation of a camera release, to execute the automatic focusing, and, after having become aware of the mode being left unchanged from the manual, would then have to turn back the mode to the automatic one before the release button was pushed down again. This implies that there was a high possibility of missing good shutter chances.

Also, the necessity of choosing the manual focus mode is limited to particular photographic situations where the automatic focusing gives undesired results, for example, a focusing is desired independently of the position of a subject of principal interest. Therefore, there has been no need of making independently settable the auto-focus and manual focus modes. But, because a manually operating member was necessarily used for changing over between the auto-focus and manual focus modes, the above-described problems arose.

Also, in case when, in addition to the auto-focus function, the power zoom function, which is performed with a motor by pushing down an operating button, is installed in the camera, another problem arose that while zooming was being performed by pushing down the operating button, the release button was pushed down to operate the auto-focus function, with the result that the zooming operation and the focusing operation occurred simultaneously which made it difficult to quickly establish the in-focus condition.

As the capabilities of the camera are broadened to include the auto-focusing, the manual focusing, a motorized visual focusing and the motorized zooming, there will be at least three operating members, giving rise to a problem that the space large enough to admit of the arrangement of these three operating members is not available. Moreover, this will become a cause for mistaken operations.

SUMMARY OF THE INVENTION

With the foregoing in mind, it is an object of the present invention to eliminate the above-described problems and to provide a camera having the auto-focus and manual focus functions coordinated in such a manner that either one of these two functions is automatically selected depending on the output of a focus detecting circuit.

Another object of the present invention is to provide a focusing device in which the focus detecting is operated by the auto-focus function, and only after such focusing has been completed, the manual focusing is made selectable, for example, only after the in-focus condition has been established by the auto-focusing, or only when the focus detecting is impossible to perform, the manual focusing is allowed to carry out, as the automatic focusing normally takes place, while the manual focusing is selected as necessity arises.

Another object of the present invention is to provide a focusing device which enables the automatic focusing to be performed quickly and with high reliability as an initiation of an automatic focusing operation at a time during zooming, or an initiation of a zooming operation at a time during automatic focusing is inhibited.

Another object of the present invention is to provide a camera having broadened capabilities of automatic focusing, power zooming, and motorized visual focusing, while still permitting the manageability to be improved.

Another object of the present invention is to provide a focusing device in which the focusing speed is high when in the automatic mode, and low when in the manual mode so that when in the manual mode, accurate and reliable focusing can be carried out.

Another object of the present invention is to provide a focusing device in which after the termination of the manual focusing operation, the mode is automatically switched back to the automatic focusing one, thereby the above-described problems are eliminated.

Other objects of the invention will become apparent from the following description of an embodiment thereof by reference to the drawings.

DETAILED DESCRIPTION OF THE PREFERRED EMBODIMENT

Figure 1:
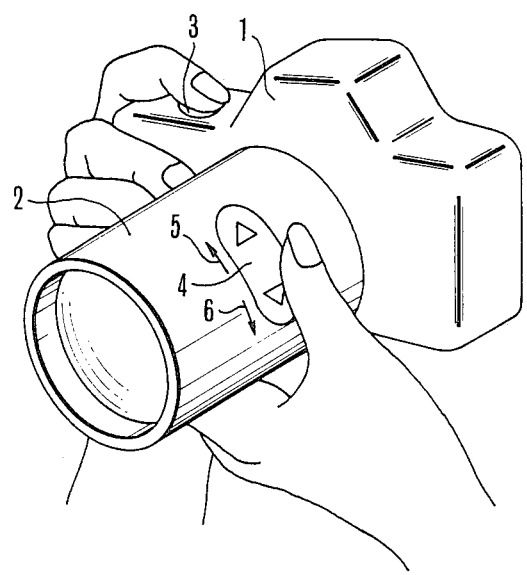
FIG. 1 is a pictorial perspective view illustrating the outer appearance of a camera provided with a changeover circuit for the auto-focus and manual focus of the invention.

In FIG. 1 there is shown the appearance of the camera employing the lens drive device of the invention. A camera body 1 has a lens barrel 2 releasably attached thereto at the mount. A release button 3 is on the body 1, and a zooming control knob 4 is positioned on the barrel 2 at such a location that when the barrel 2 is supported by the left hand, the control knob 4 can be easily moved by the thumb. The knob 4 normally lies at the neutral position. When it is moved in a clockwise direction of arrow 5, the lens is zoomed toward the telephoto end, and when the knob is moved in a counterclockwise direction of arrow 6, the lens is moved toward the wide angle side.

Figure 2:
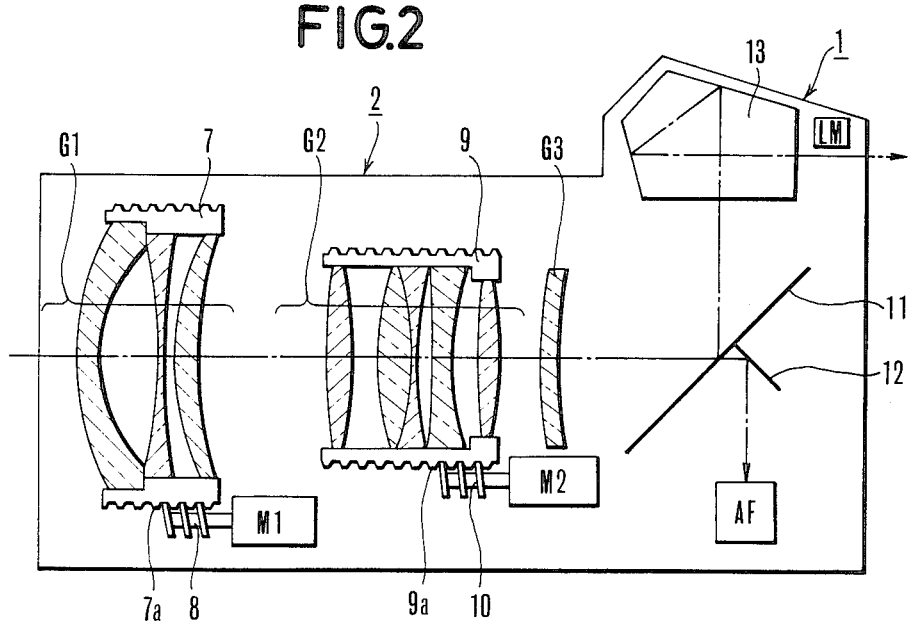
FIG. 2 is a longitudinal section view of the internal mechanisms of the camera shown in FIG. 1.

FIG. 2 illustrates the internal mechanisms of the camera body 1 and the lens b.arrel 2. A cell 7 containing a focusing lens unit G1 has a rack 7a meshing with a worm gear 8 fixedly mounted on the output shaft of an electric motor M1. Another cell 9 containing a zoom lens unit G2 also has a rack 9a meshing with a worm gear 10 on the output shaft of another electric motor M2. G3 denotes a relay lens.

A main mirror 11 has its central portion half-mirrored so that light entering through the photographic lens G1, G2, G3 and transmitted therethrough is reflected by a sub-mirror 12 to an auto-focus circuit AF. A pentagonal roof type prism 13 conducts the reflected light from the mirror 11 not only to an eyepiece (not shown) but also to a light metering circuit LM.

Figure 3:
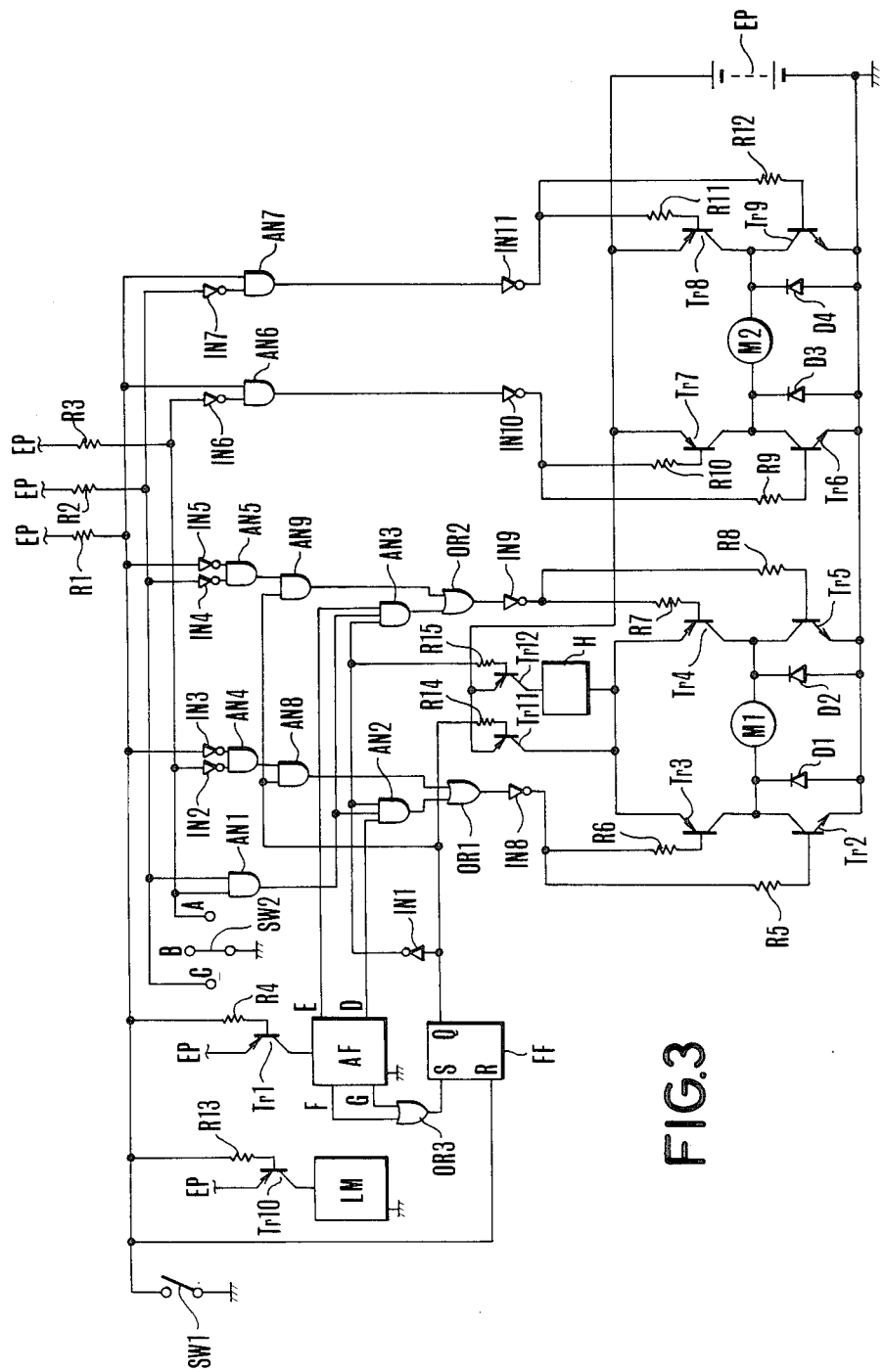
FIG. 3 an electrical circuit diagram of an embodiment of the changeover circuit for the auto-focus and manual focus modes according to the invention.

FIG. 3 is a drive circuit arranged in the camera body 1 to drive the lens barrel 2 shown in FIGS. 1 and 2. In FIG. 3, a switch SW1 is responsive to the first stroke of the release button 3 of FIG. 1. This switch SW1 may otherwise be constructed in the form of a touch switch which turns on when the release button is touched. Another switch SW2 is responsive to the knob 4 of FIG. 1, having three throws A, B and C to which a pole is selectively connected when the knob 4 moves to the side of arrow 5, stays in the neutral position, or moves to the side of arrow 6, respectively. EP is an electrical power source or battery. R1–R3 are protection resistors. R4–R15 are base resistors for transistors. The AF circuit AF is supplied with electrical power from the battery EP through a switching transistor Tr1. The light metering circuit LM is supplied with electrical power from the battery EP through a switching transistor Tr10. The AF circuit AF has four output terminals D, E, F and G for the infinite and minimum object distances, the in-focus condition, and the incapability of measuring the distance, respectively. A flip-flop FF has a "set" terminal S which is connected to the output of an OR gate OR3, a "reset" terminal R which is connected to the output of the switch SW1, and an output Q which is connected through an inverter IN1 to AND gates AN2 and AN3 and also through a resistor R15 to the base of a transistor Tr12. The output Q is further connected directly to AND gates AN8 and AN9 and through the resistor R14 to the base of a transistor Tr11. An AND gate AN1 has two inputs which are connected to the throws A and C of the switch SW2, and has an output which is connected to the AND gates AN2 and AN3 at one of the inputs thereof. The other two inputs of the AND gate AN2 are connected to the output of the inverter IN1 and the output D of the AF circuit AF. The other two inputs of the AND gate AN3 are connected to the output E of the AF circuit AF and the output Q of the flip-flop FF through the inverter IN1. An AND gate AN4 has two inputs which are connected through respective inverters IN2 and IN3 to the throw A of the switch SW2 and the output of the switch SW1, and has an output which is connected to the AND gate AN8. An OR gate OR1 has two inputs which are connected to the outputs of the AND gates AN8 and AN2, and has an output which is connected through an inverter IN8 and the resistors R5 and R6 to the bases of transistors Tr2 and Tr3. An AND gate AN5 has two inputs which are connected through respective inverters IN4 and IN5 to the throw C of the switch SW2 and the output of the switch SW1, respectively, and has an output which is connected to the AND gate AN9. An OR gate OR2 has two inputs which are connected to the outputs of the AND gates AN9 and AN3, and has an output which is connected through a common inverter IN9 and through the resistors R7 and R8 to the base of transistors Tr4 and Tr5, respectively. An AND gate AN6 has two inputs which are connected to the output of the switch SW1 and through an inverter IN6 to the throw A of the switch SW2, and has an output which is connected through a common inverter IN10 and through the resistors R9 and R10 to the bases of transistors Tr6 and Tr7, respectively. An AND gate AN7 has two inputs which are connected to the output of the switch SW1 and through an inverter IN7 to the throw C of the switch SW2, and has an output which is connected through a common inverter IN11 and through the resistors R11 and R12 to the bases of transistors Tr8 and Tr9, respectively. The focusing and zooming drive motors of FIG. 2 are denoted by M1 and M2, respectively. D1–D4 are diodes for braking. A circuit H produces a lower voltage than that of the battery EP.

The operation of the camera having the above-described constructional features of the invention is as follows: When the release button 3 of FIG. 1 is pushed down to the first stroke, the switch SW1 of FIG. 3 is closed, thereby the potential at the base of the transistor Tr1 is lowered. As the transistor Tr1 turns on, the AF circuit AF is then rendered operative. And as the transistor Tr10 also turns on, the light metering circuit LM is rendered operative. With the image out of sharp focus, when the AF circuit AF detects the direction in which the focusing lens G1 should move to bring the image into focus as the infinite side or minimum side, an output of high level is produced from the terminal D or E, respectively. When the sharp focus of the image is reached, the outputs of the terminals D and E both take low level, but the terminal F produces an output of high level. If it is impossible to measure the object distance, for example, in the case of the passive type, it is dim, or low contract, and, in the case of the active type, the object to be photographed is very far, an output of high level is produced. A modification may be made that when the usual focusing time has expired with the image left out of focus, the output is produced.

Now assuming that the output terminal D of the AF circuit AF is high level, being applied to the AND gate AN2. As the zoom control switch 4 is not operated, the switch SW2 lies in the neutral position B, so that both inputs of the AND gate AN1 are high level, and, therefore, its output is high level being applied to the AND gate AN2. Also since the flip-flop FF is not set until the output terminal F or G of the AF circuit AF produces high level, it produces the output Q of low level which is inverted by the inverter IN1 to high level. This high level is applied to the AND gate AN2. Thus, the AND gate AN2 produces an output of high level. Because this is applied to the OR gate OR1, the output of the OR gate OR1 also becomes high level. Also, at this time, the output Q of the flip-flop FF is low level, causing the transistor Tr11 to turn on and the motor circuit to be supplied with current from the battery EP. The transistor Tr3 is turned on by the output of high level from the OR gate OR1. At this time, there is applied to the AND gate AN3 the low level from the output terminal E of the AF circuit AF. Therefore, the output of the AND gate AN3 becomes low level which is applied to the OR gate OR2. Also, there is applied to one of the input terminals of the AND gate AN5, because the switch SW1 is closed, the output of high level from the inverter IN5, but to the other input terminal there is applied, because the switch SW2 is in the neutral position B, the output of low level from the inverter IN4. Therefore, the output of the AND gate AN5 becomes low level which is applied to the OR gate OR2. Thus, the OR gate OR2 also produces an output of low level. Therefore, the transistor Tr5 turns on. Hence, current flows: the battery EP→the transistor Tr3→the motor M1→the transistor Tr5. As the motor M1 rotates in the normal direction the focusing lens cell 7 is axially moved rearward to effect focusing to suit longer object distances by the worm gear 8 of FIG. 2. In this case, because the voltage of the battery EP itself is applied to the motor M1, the automatic focusing is operated at as fast a speed as possible. When moved to the in-focus position, the computation result of the AF circuit AF changes its output D to low level. The output of the AND gate AN2 then changes to low level, and the output of the OR gate OR1 then changes to low level, causing the transistors Tr3 and Tr2 to turn off and on, respectively, through the inverter IN8. A braking circuit: the motor M1→the transistor Tr2→the diode D2→the motor M1, is then closed. Thus, the motor M1 is rapidly stopped. At the same time, the AF circuit AF responsive to in-focus changes its output F to high level. The flip-flop FF then produces the output of high level as the output Q which is then applied through the inverter IN1 to the AND gates AN2 and AN3. This implies that once the in-focus condition is established, despite that the camera angle changes from the object in focus, the AF motor M1 continues stopping regardless of the states of the outputs D and E of the AF circuit. For note, to release the motor M1 from the locking in stoppage, the photographer needs only to remove his finger from depressing the release button 3 to open the switch SW1. A signal of high level is then applied to the "reset" terminal R of the flip-flop FF, thereby its output Q is changed to low level. Thus, the initial position is regained.

Alternatively, assuming that the computation result of the circuit AF indicates the direction in which the focusing lens G1 moves toward the minimum object distance, then the AF produces the output of high level at the terminal E. Responsive to this, the OR gate OR2 changes its output to high level; thereby, the transistor Tr4 is turned on. Meanwhile, since the output D of the AF circuit AF is low evel, the output of the AND gate AN2 is low level. Also since the switch SW2 is in the neutral position B, the inverter IN2 produces an output signal of low level which is applied to the AND gate AN14. Therefore, the output of the AND gate AN4 is low level. Hence, the output of the OR gate OR1 changes to low level; thereby, the transistor Tr2 is turned on. Therefore, current flows: the transistor Tr4→the motor M1→the transistor Tr2, so that the motor M1 rotates in the reverse direction, driving the focusing lens unit G1 to move forward to effect focusing down to shorter object distances. In such a manner the focusing is adjusted. When the sharp focus is reached, the output E of the AF circuit AF changes to low level. This, in turn, causes the output of the AND gate AN3 to change to low level and then the output of the OR gate OR2 to change to low level. Therefore, the transistor Tr5 turns on, closing the braking circuit: the motor M1→the transistor Tr5→the diode D1→the motor M1. Thus, the motor M1 is stopped.

Next explanation is given to the power zooming operation. As shown in FIG. 1, while the photographer hold the camera in his right hand, his left hand thumb manipulates the zoom control knob 4. If he desires to zoom toward the telephoto side, the knob 4 must be moved in the direction of arrow 5. Such movement causes the switch SW2 of FIG. 3 to move to its A position where the inverter IN6 produces an output signal of high level which is applied to the AND gate AN6. As, at this time, the release button 3 is not operated, the switch SW1 remains closed, leaving the other input of the AND gate AN6 at high level. Hence, the AND gate AN6 produces an output of high level. The AND gate AN7 produces an output of low level. As a result, the transistors Tr7 and Tr9 are turned on, allowing current to flow: the transistor Tr7→the motor M2→the transistor Tr9. Thus, the motor M2 rotates in the normal direction. In FIG. 2, the worm 10 transmits the motion of the motor M2 to axially move the zoom lens unit G2 in the cell 9 forward so that the focal length of the entire system is increasing. At a time during such zooming, the photographer will turn back the knob 4 to the neutral position. Then, the switch SW2 moves to the position B, thereby the output of the AND gate AN6 is changed to low level. Because the transistor Tr6 is turned on, the braking circuit: the motor M2→the transistor Tr6→the diode D4→the motor M2 is closed, stopping the motor M2 rapidly.

Conversely when it is desired to zoom toward the wide angle side, the photographer turns the knob 4 in the direction of arrow 6, thereby, the switch SW2 is moved to the position C where the AND gate AN7 produces an output of high level to turn on the transistor Tr8. Also since, at this time the output of the AND gate AN6 is low level, the transistor Tr6 turns on. As a result, current flows: the transistor Tr8→the motor M2→the transistor Tr6. Thus, the motor M2 rotates in the reverse direction, moving the zoom lens unit G2 in the cell 9 rearward resulting in a decrease in the focal length of the entire system.

Next, explanation is given to the power focus mode. This mode is used as an assistant to the autofocus mode. In the usual photographic situations, therefore, after the in-focus condition is determined in the auto-focus mode, if the photographer takes it as undesirable, he proceeds to visually re-focus the finder image intentionally finely without changing the composition in the picture frame. Otherwise it is used in situations where the AF circuit is unable to measure the object distance.

Now assuming that the in-focus condition is reached by the automatic focusing as has been described above. In this case, the output of the circuit AF at the terminal F has high level. Therefore, the flip-flop FF gives the signal of low level to the AND gates AN2 and AN3 through the inverter IN1. From this reason, regardless of the states of the output D or E of the AF circuit AF, the AND gates AN2 and AN3 produce the outputs of low level. Also since at this time the output Q of the flip-flop FF is applied to the AND gates AN8 and AN9, what state the output of the OR gate OR1 takes is determined by the output of the AND gate AN4, and what state the output of the OR gate OR2 takes is determined by the output of the AND gate AN5. Also, since at this time the output Q of the flip-flop FF is high level, for the transistor Tr11 turns off and the transistor Tr12 turns on, the low voltage circuit H is chosen to supply a lower voltage than that of the battery EP to the drive circuit for the motor M1.

To finely adjust the sharpness of the image from the automatically set in-focus state toward far focus, the photographer while continuing to depress the release button 3 needs to move the control knob 4 in the direction of arrow 5. In this condition, the switch SW1 of FIG. 3 is closed so that the inverter IN3 produces the output of high level which is applied to one of the inputs of the AND gate AN4, and the switch SW2 is set in the A position by the operation of the knob 4 to the side of arrow 5 so that the inverter IN2 produces the output of high level which is applied to the other input of the AND gate AN4. Therefore, the AND gate AN4 produces the output of high level. Responsive to this, the AND gate AN8 produces the output of high level, and then the OR gate OR1 also produces the output of high level, thereby the transistor TR3 is turned on. Meanwhile, the output of the OR gate OR2 is left unchanged from low level. Therefore, the transistor TR5 is in conducting state. Thus, current from the low voltage circuit H flows: the transistor Tr3→the motor M1→the transistor Tr5, rotating the motor M1 in the normal direction with fine adjustment of the sharpness of the finder image. It is to be noted here that the voltage applied to the motor M1 is so low that the focusing unit G1 moves at a speed slow enough to easily make the visual fine focus adjustment.

When the desired degree of sharpness of the image is reached, the operator must soon remove his thumb from the control knob 4. As the switch SW2 returns to the neutral position B, the output of the AND gate AN4 changes to low level, and the output of the OR gate OR1 also changes to low level, thereby the transistor Tr2 is turned on. The braking circuit: the motor M1→the transistor Tr2→the diode D2→the motor M1, is then closed to rapidly stop the motor M1. As this is then followed by a computation of the AF circuit AF, if its result indicates an out-of-focus condition, the output of high level is produced from the terminal E, for the focusing lens unit G1 is to be moved backward. But, because the in-focus condition has once been established in the auto-focus mode, the output Q of the flip-flop FF has been maintaining the output of the AND gate AN3 at low level. Therefore, for the fine focus adjustment that follows the automatic establishment of the in-focus condition, the circuit AF is prohibited from moving the focusing lens unit G1 backward. This permits the photographer to perform re-focusing by his intention.

To release the circuit AF from the locking in idle, the photographer needs only to remove his finger from the release button 3. The switch SW1 then opens, applying the signal of high level to the "reset" terminal R of the flip-flop FF. Because its output Q becomes low level, if the release button 3 is pushed down again to the first stroke, the auto-focus mode operates again.

When the fine focus adjustment after the automatic establishment of the in-focus condition is directed toward near focus, the photographer turns the control knob 4 to the direction of arrow 6. The switch SW2 then moves to the position C where the output of the OR gate OR2 changes to high level so that the current flows: the transistor Tr4→the motor M1→the transistor Tr2, rotating the motor M1 in the reverse direction. Thus, the fine focus adjustment goes to shorter object distances.

In case where the circuit AF becomes impossible to measure the degree of image sharpness, the output G takes high level and sets the flip-flop FF through the OR gate OR3. So, while the release button is being pushed down, the control knob 4 is operated. Depending on the switched position of the switch SW2, the focusing lens unit G1 is driven by the motor M1 to move either forward or rearward. Thus, visual focusing is performed with the help of hte motor M1. In this manual focus mode, because the switch SW1 is closed, the signal of low low level is inputted to the AND gates AN6 and AN7, the motor M2 is held stopped and no zooming operation can be performed.

As has been described above, according to the invention, the power focusing is made possible to perform after the image has been sharply focused, or when a photographic situation that spoils the capability of measuring the object distance is encountered. Moreover, the camera is automatically switched to the power focus mode when the operation of the auto-focus mode results in the in-focus condition, so long as the release button continues being pushed down.

Also, in the embodiment of the invention, if the release button is pushed down at a point in the progress of zooming, the zoomng operation is interrupted. And, if the control knob 4 is operated at a point in the progress of automatic focusing, the initiation of a zooming operation does not take place. Therefore, even if the release button 3 is pushed down to the first and second strokes in sequence at a time during power zooming, the camera release goes on in a way known in the art, with the zoom lens unit G2 held stationary so that during the exposure, the image on the film is prevented from being blurred.

Though the embodiment has been described as the control knob 4 is arranged to be accessible by the thumb of the left hand when the camera is hand-held, it is to be understood that such a holding attitude prevails in the single lens reflex cameras, and it may be positioned somewhere else provided the camera can be held steadily. Also, the release button 3 and the control knob 4 may be otherwise positioned to be accessible by fingers of one and the same hand. Also, the speed of power focusing movement has only one value. But it may be otherwise changed over between two different values for the fine adjustment after the sharp focus, and the visual focusing due to the incapability of measuring the object distance.

Another modification of the illustrated embodiment is such that in FIG. 3, the outputs of the AND gates AN8, AN9 are inputted to the inverters IN10, IN11, and the outputs of the AND gates AN6 and AN7 are inputted to the OR gates OR1 and OR2 so that the power focusing is operated by the control knob 4 and the power zooming can be carried out by operating the release button 3 and the control knob 4.

Thus, the present invention is to provide a camera whose manageability for switching between the auto and manual focus modes is very quick and easy.

Also, in the invention, the focusing and zoom lens units G1 and G2 are driven by separate respective motors M1 and M2. So they can be moved only by operating the switches without having to employ the mechanical drive connections which would otherwise be necessary when they are moved by hand. This produces an advantage of simplifying the structure of construction of the operating mechanisms. Further only one operating member suffices for controlling the direction of movement of the zoom lens unit and the focusing lens unit. Thus, the number of operating members is limited to a minimum. This permits all operating members to be actuated without changing the position of the operator's hands holding the camera, giving an additional advantage that there is no possibility of increasing the camera-shake. In the embodiment, another modification is that the speed of focusing movement is changed over between two values for the auto-focus mode and the manual power focus mode with an advantage that the separate motors play full mobile roles.

What is claimed is:
1. A focusing device, comprising:

(a) a focus detecting circuit for detecting a state of focus;
(b) a drive circuit for driving a lens based on an output from said focus detecting circuit;
(c) a manually operating member for manually effecting a focusing operation; and
(d) an allowing circuit for allowing a lens driving by operating said manual operating member after an in-focus condition is secured by a lens driving by said drive circuit based on an output of said detecting circuit, said allowing circuit prohibiting a lens driving by operating the manual operating member until an in-focus state is established by the lens driving by the drive circuit based on an output of said detecting circuit.

2. A device according to claim 1, wherein said allowing circuit has a change-over circuit for discontinuing a response of the drive circuit to the output of the focus detecting circuit when an in-focus state is established by the lens driving by the drive circuit based on the output of said detecting circuit, instead allowing a response of the drive circuit to a signal formed by an operation of said manual operating member.

3. A device according to claim 2, wherein a drive speed control circuit is provided for controlling the lens driving speed by the drive circuit with the signal formed by the operating member to a lower speed than the lens driving speed by the drive circuit based on the output of said detecting circuit.

4. A camera having an auto-focus circuit comprising:
(a) an auto-focus circuit for making a lens to in-focus state;
(b) a first operating member for actuating said auto-focus circuit;
(c) a zoom circuit for performing zooming;
(d) a second operating member for actuating said zooming circuit; and
(e) a prohibiting circuit for prohibiting an operation of said zoom circuit in response to an operation of said first operating member when said zoom circuit is being operated by said second operating member.

5. A camera having an auto-focusing circuit comprising:
(a) an auto-focus circuit for making a lens to in-focus state;
(b) a first operating member for actuating said auto-focus circuit;
(c) a zoom circuit for performing zooming;
(d) a second operating member for actuating said zoom circuit; and
(e) a prohibiting circuit for prohibiting said zoom circuit from being responsive to said second operating member despite said second operating member being actuated during the time when said auto-focus circuit is operating by said first operating member.

6. A camera according to claim 4 or 5, wherein said first operating member is a shutter release button.

7. A camera comprising:

(a) a zoom circuit for performing zooming;
(b) a focusing circuit for performing focusing;
(c) a first operating member;
(d) a control circuit for making said zoom circuit responsive to actuation of said second operating member so that the zooming operation is performed, and when said first and second operating members are actuated, making said focusing circuit responsive thereto in replacement of said zoom circuit.

8. A focus control device having an auto-focus mode for shifting a lens automatically to an in-focus position by an output of a focus detecting circuit and a manual mode for driving the lens by an operation of a manual operating member, comprising:
(a) a change-over circuit for changing over from the auto-focus mode to the manual mode; and
(b) a control circuit for actuating said change-over circuit to effect a change over from the auto-focus mode to the manual mode when a lens driving has been done under said auto-focus mode and an in-focus state has been established.

9. A device according to claim 8, wherein said focusing control device has a drive circuit for driving the lens in response to an input signal, and said change-over circuit selects an output of the focus detecting circuit under the auto-focus mode and inputs the same into the drive circuit, and selects the operating signal of the manual operating member under the manual mode and inputs the same into the drive circuit.

10. A device according to claim 9, wherein a driving speed control circuit is provided for controlling the lens driving speed by the drive circuit under the manual mode at a lower speed than the lens driving speed by the driving circuit under the auto-focus mode.

11. A focal control device having an auto-focus mode for shifting a lens automatically to an in-focus position by an output of a focus detecting circuit and a manual mode for driving the lens by operating a manual operating member, comprising:
(a) an operating switch for effecting the lens driving under said auto-focus mode; and
(b) a change-over circuit for changing over from the auto-focus mode to the manual mode in response to a signal representing an incapability of detecting focus when said signal is outputted from the focus detecting circuit under said auto-focus mode, said change-over circuit prohibiting the lens driving under the auto-focus mode after changing over from the auto-focus mode to the manual mode and until said operating switch is operated again.

12. A device according to claim 11, wherein said change-over circuit has selection means for selecting the auto-focus mode under a first state and for selecting the manual focus mode under a second state, and a holding circuit for shifting the selection means from the first state to the second state in response to said signal representing the incapability of detecting focus, and holding said second state until the operating state of the operating switch is relaxed.

* * * * *